US009634516B2

(12) United States Patent
Gale et al.

(10) Patent No.: US 9,634,516 B2
(45) Date of Patent: Apr. 25, 2017

(54) METHOD AND SYSTEM FOR MONITORING TEMPERATURE OF A POWER DISTRIBUTION CIRCUIT

(75) Inventors: Allan Roy Gale, Livonia, MI (US); Michael W. Degner, Novi, MI (US); Larry Dean Elie, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2306 days.

(21) Appl. No.: 12/423,169

(22) Filed: Apr. 14, 2009

(65) Prior Publication Data

US 2010/0259242 A1    Oct. 14, 2010

(51) Int. Cl.
| | |
|---|---|
| *H02J 7/02* | (2016.01) |
| *B60L 3/04* | (2006.01) |
| *B60L 11/18* | (2006.01) |
| *G01K 7/16* | (2006.01) |
| *H02J 7/04* | (2006.01) |

(52) U.S. Cl.
CPC ............. *H02J 7/027* (2013.01); *B60L 3/04* (2013.01); *B60L 11/1816* (2013.01); *G01K 7/16* (2013.01); *B60L 2240/36* (2013.01); *H02J 7/047* (2013.01); *Y02T 10/7005* (2013.01); *Y02T 10/7072* (2013.01); *Y02T 90/14* (2013.01)

(58) Field of Classification Search
CPC ... H02J 7/027; H02J 7/047; B60L 3/04; B60L 11/1816; B60L 2240/36; G01K 7/16; Y02T 10/7072; Y02T 10/7005; Y02T 90/14
USPC ......................................................... 320/150
See application file for complete search history.

(56) References Cited

U.S. PATENT DOCUMENTS

| | | | | |
|---|---|---|---|---|
| 4,474,825 | A * | 10/1984 | Schmidt ........................... 427/10 |
| 4,573,132 | A * | 2/1986 | Boothman et al. ............. 702/132 |
| 5,181,026 | A * | 1/1993 | Granville .................. 340/870.28 |
| 5,451,881 | A * | 9/1995 | Finger ............................ 324/433 |
| 5,590,964 | A * | 1/1997 | Obara et al. .................... 374/141 |
| 5,598,084 | A | 1/1997 | Keith |
| 5,670,860 | A * | 9/1997 | Conrady et al. ............... 320/109 |
| 5,725,307 | A * | 3/1998 | Obara et al. .................... 374/137 |
| 5,952,813 | A | 9/1999 | Ochiai |
| 5,995,350 | A * | 11/1999 | Kopelman .................... 361/103 |
| 6,087,802 | A | 7/2000 | James |
| 6,348,777 | B1 * | 2/2002 | Brown et al. .................. 320/160 |
| 6,396,241 | B1 * | 5/2002 | Ramos et al. ................. 320/108 |
| 6,479,968 | B1 * | 11/2002 | Pozsgay et al. ............... 320/137 |
| 6,963,186 | B2 | 11/2005 | Hobbs |
| 7,107,162 | B2 * | 9/2006 | Zima et al. ...................... 702/65 |

(Continued)

OTHER PUBLICATIONS

James P. Noon et al., UC3855A/B High Performance Power Factor Preregulator, Unitrode Corporation, U-153, pp. 1-20, 1999.

(Continued)

*Primary Examiner* — Richard Isla Rodas
*Assistant Examiner* — Manuel Hernandez
(74) *Attorney, Agent, or Firm* — David B. Kelley; Brooks Kushman P.C.

(57) ABSTRACT

A method for monitoring a temperature change of a power distribution circuit having a power line and return line includes measuring an output current and output voltage of the power distribution circuit at an input to a load electrically connected to the power distribution circuit, and determining a change in temperature of at least one of the power line and return line based on a change in at least one of the output current and output voltage.

5 Claims, 2 Drawing Sheets

(56) References Cited

U.S. PATENT DOCUMENTS

| | | | |
|---|---|---|---|
| 7,593,747 B1* | 9/2009 | Karam et al. | 455/522 |
| 2005/0222808 A1* | 10/2005 | Zima et al. | 702/182 |
| 2006/0132085 A1 | 6/2006 | Loubeyre | |
| 2007/0038396 A1* | 2/2007 | Zima et al. | 702/65 |
| 2008/0122400 A1 | 5/2008 | Kubota et al. | |
| 2009/0174362 A1* | 7/2009 | Richardson et al. | 320/105 |
| 2009/0218988 A1* | 9/2009 | Richardson et al. | 320/134 |
| 2010/0277127 A1* | 11/2010 | Flack | 320/137 |

OTHER PUBLICATIONS

Yijing Chen, et al., Control of a Single-Phase PFC Preregulataor [sic] Using an 8-BIT Microcontroller, pp. 1454-1460, 1-4244-0714-1/07, 2007, IEEE.

James P. Noon, A 250kHz, 500W Power Factor Correction Circuit Employing Zero Voltage Transitions, Unitrode Corporation, pp. 1-1 to 1-16, Oct. 1994, Texas Instruments Incorporated.

\* cited by examiner

METHOD AND SYSTEM FOR MONITORING TEMPERATURE OF A POWER DISTRIBUTION CIRCUIT

BACKGROUND

A power cable is an assembly of two or more electrical conductors, usually held together with a sheath. The assembly may be used for transmission of electrical power. Power cables may be installed, for example, as permanent wiring within buildings, buried in the ground, run overhead or exposed. Flexible power cables may be used for portable devices, mobile tools and machinery.

Cables may include three major components: conductors, insulation and protective jacketing. The makeup of individual cables may vary according to application. The construction and material may be determined by the working voltage, current-carrying capacity and environmental conditions.

Power cables may use stranded copper or aluminum conductors. Small power cables may use solid conductors. The cable may include un-insulated conductors for circuit neutral or ground (earth) connection.

The overall assembly may be round or flat. Non-conducting filler strands may be added to the assembly to maintain its shape. Special purpose power cables for overhead or vertical use may have additional elements such as steel or Kevlar structural supports.

Common types of general-purpose cables are regulated by national and/or international codes. These codes define the various wire alloys that may make up a cable, its insulation type and characteristics, including its resistance to chemicals and sunlight.

Commonly-used power cables may contain an un-insulated bare wire for connection to earth ground. Three prong power outlets and plug-cords require a grounding wire. Extension cables often have an insulated grounding wire.

ROMEX is a cable made of solid copper wires with a nonmetallic plastic jacket containing a waxed paper wrapped inner group of at least a pair of 600 volt THWN plastic insulated service wires and a bare ground wire. A common ROMEX cable may thus have three wires: a neutral wire (colored white), a wire providing power to the load (colored black) and a bare grounding wire.

Another common ROMEX variant has a neutral, identified by white coloring, two phase wires: a first conductor (black) and a second conductor (usually red), and an un-insulated copper grounding wire. This type may be generally used for multiple switching locations of a common or shared lighting arrangement, such as for switches located at either end of a hallway, or on both upper and lower floors for stairway lighting.

SUMMARY

A method for monitoring a temperature change of a power distribution circuit having a power line and return line includes measuring an output current and output voltage of the power distribution circuit at an input to a load electrically connected to the power distribution circuit, and determining a change in temperature of at least one of the power line and return line based on a change in at least one of the output current and output voltage.

An automotive vehicle having a power storage unit capable of receiving power from a power distribution circuit having a power line and return line includes a monitoring circuit capable of being electrically connected between the power distribution circuit and the power storage unit. The monitoring circuit is configured to measure an output current and output voltage of the power distribution circuit, and determine a change in temperature of at least one of the power line and return line based on a change in at least one of the output current and output voltage.

A battery charger capable of receiving power from a power distribution circuit having a power line and return line, and capable of transferring the power to a battery includes a monitoring circuit. The monitoring circuit is configured to measure an output current and output voltage of the power distribution circuit at the battery charger, and to determine a change in temperature of at least one of the power line and return line based on a change in at least one of the output current and output voltage.

A method for monitoring a temperature change of a power distribution circuit having a power line and return line includes measuring an output current or output voltage of the power distribution circuit at an input to a load electrically connected to the power distribution circuit, measuring an input current and input voltage to the load, and determining a change in temperature of at least one of the power line and return line based on a change in at least one of the output current, output voltage, input current and input voltage.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

Figure 1:
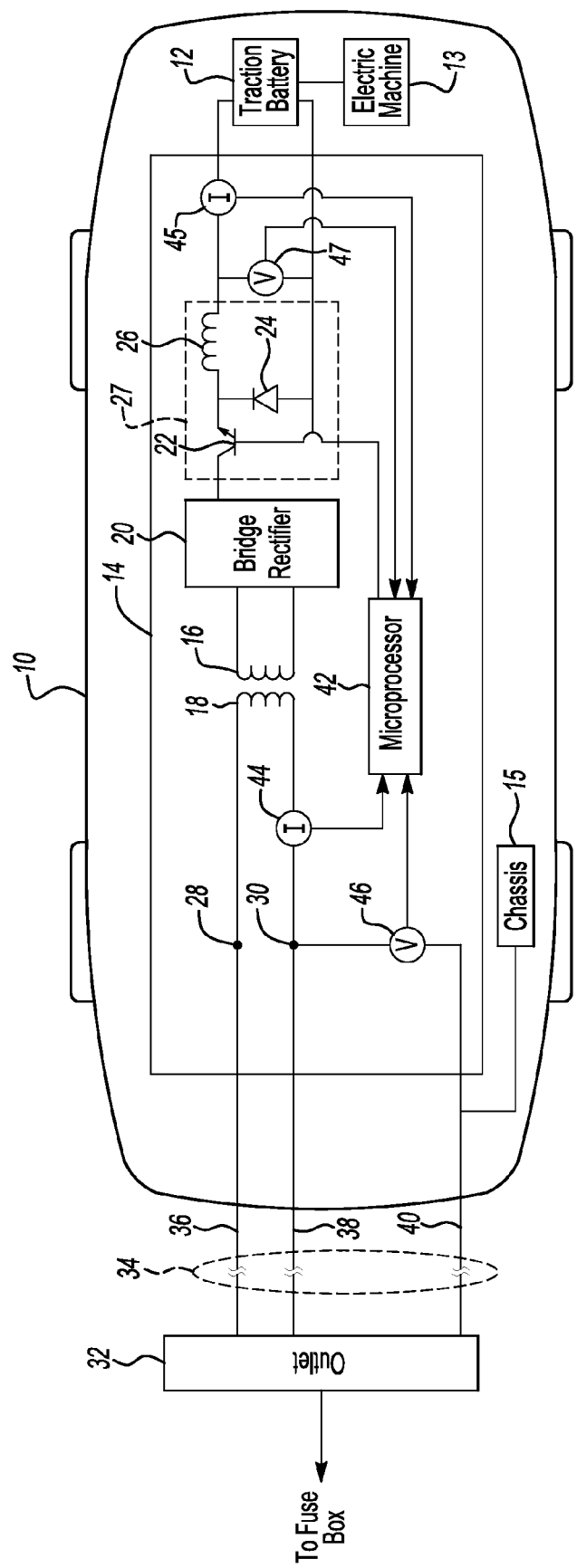
FIG. 1 is a schematic diagram of an automotive vehicle according to an embodiment of the invention.

Referring now to FIG. 1, an embodiment of an automotive vehicle 10, e.g., hybrid electric, electric, etc., includes a traction battery 12, electric machine 13, battery charger 14 and chassis 15. As apparent to those of ordinary skill, the traction battery 12 may provide motive power for the vehicle 10 via the electric machine 13.

The battery charger 14 may include a pair of coils 16, 18, a bridge rectifier 20, transistor 22, diode 24 and inductor 26. As apparent to those of ordinary skill, the transistor 22, diode 24 and inductor 26 form a buck regulator 27 and may be used to regulate the current from the bridge rectifier 20 to the traction battery 12.

The coil 18 includes a power terminal 28 and a return terminal 30. The coil 18 may be electrically connected with an electrical outlet 32 via a power cable 34. The electrical outlet 32 of FIG. 1 is a 120 V wall outlet. In other embodiments, the electrical outlet 32 may be a 240 V wall outlet, a multiphase wall outlet, etc. As known in the art, the turn ratio of the coils 16, 18 may depend on the voltages associated with the battery 12 and outlet 32.

The coil 16 may be electrically connected with the traction battery 12 through the bridge rectifier 20, transistor 22 and inductor 26. As known in the art, the bridge rectifier 20 (or diode bridge) may be an arrangement of four diodes in a bridge configuration. This arrangement may provide the same polarity of output voltage for any polarity of input voltage. In this embodiment, the bridge rectifier 20 converts alternating current input into direct current output.

The power cable 34 includes a power line 36, return line 38 and ground line 40. The power line 36 is electrically connected with the power terminal 28. The return line 38 is electrically connected with the return terminal 30. The ground line 40 is electrically connected with the chassis 15. In the embodiment of FIG. 1, the power line 36 delivers current from the outlet 32 to the coil 18 and the return line 38 delivers current from the coil 18 to the outlet 32.

The battery charger 14 may also include a microprocessor 42, current sensors 44, 45 and voltage sensors 46, 47. The microprocessor receives current and voltage information from the current sensors 44, 45 and voltage sensors 46, 47. In the embodiment of FIG. 1, the current sensor 44 senses current through the coil 18 and return terminal 30 and the voltage sensor 46 senses voltage between the return terminal 30 and ground line 40. The current sensor 45 senses current to the traction battery 12 and the voltage sensor 47 senses voltage across the traction battery 12. Other arrangements, however, are also possible. As an example, the voltage sensor 46 may be positioned to sense voltage between the power terminal 28 and return terminal 30. As another example, the current sensor 44 and/or voltage sensor 46 may be positioned to sense current and/or voltage between the bridge rectifier 20 and transistor 22. Other configurations are also contemplated.

The microprocessor 42 may determine a change in temperature of the power and/or return lines 36, 38 based on, for example, the current and voltage measured by the current and voltage sensors 44, 46. The instantaneous resistance, R, of a wire having a temperature coefficient of resistance, $\alpha$, may be related to a change in temperature, $\Delta T$, of the power and/or return lines 36, 38 by the following relation:

$$R = R_i(1 + \alpha \Delta T), \quad (1)$$

or $$\Delta T = \frac{\Delta R}{\alpha R_i} \quad (2)$$

where $R_i$ is the initial resistance of the wire. In terms of voltages and currents, equation (2) may be rewritten as $$\Delta T = \left(\frac{V}{I} - \frac{V_i}{I_i}\right)\left(\frac{I_i}{V_i}\right)\left(\frac{1}{\alpha}\right), \quad (3)$$

or $$\Delta T = \left(\frac{VI_i}{V_i I} - 1\right)\left(\frac{1}{\alpha}\right) \quad (4)$$

where I and V are the instantaneous current and voltage measured respectively by the sensors 44, 46, and $I_i$ and $V_i$ are the initial current and voltage measured respectively by the sensors 44, 46. Based on equation (4), the microprocessor 42 may determine a change in temperature of the power and/or return lines 36, 38 based on the current and voltage measured by the current and voltage sensors 44, 46. In other embodiments, the battery charger 14 may control the current flow through it to keep it generally constant, in a known fashion, and thus the microprocessor 42 may determine a change in temperature of the power and/or return lines 36, 38 based only on the voltage measured by the voltage sensor 46. In still other embodiments, the microprocessor 42 may determine a change in temperature of the power and/or return lines 36, 38 based on the voltage measured between the power terminal 28 and return terminal 30. As apparent to those of ordinary skill (using the notation described above), $$R_i = \frac{V_{LN}^- - V_{LNi}^+}{2I} \quad (5)$$

$$R = \frac{V_{LN}^- - V_{LN}^+}{2I} \quad (6)$$

where $V_{LN}^-$ is the instantaneous voltage between the power terminal 28 and return terminal 30 just before current begins passing through the battery charger 14, $V_{LNi}^+$ is the instantaneous voltage between the power terminal 28 and return terminal 30 just after current begins passing through the battery charger 14, and $V_{LN}^+$ is the instantaneous voltage between the power terminal 28 and return terminal 30 at any time after current begins passing through the battery charger 14. Substituting equations (5) and (6) into equation (2) (and simplifying) yields $$\Delta T = \left(\frac{V_{LN}^- - V_{LN}^+}{V_{LN}^- - V_{LNi}^+} - 1\right)\left(\frac{1}{\alpha}\right) \quad (7)$$

Based on equation (7), the microprocessor 42 may thus determine a change in temperature of the power and/or return lines 36, 38 based on the voltage measured between the power terminal 28 and return terminal 30.

Alternatively, a temperature or change in temperature of the power and/or return lines 36, 38 may be determined in any suitable fashion. For example, temperature sensors (not shown), e.g., Wheatstone bridge, diode junction, etc., in communication with the microprocessor 42 and connected with the power and/or return lines 36, 38 may detect and communicate the temperature of the power and/or return lines 36, 38 to the microprocessor 42.

The microprocessor 42 may turn on and turn off the transistor 22 to control the flow of current to the traction battery 12. The microprocessor 42 may thus control the flow of current through the power and/or return lines 28, 30 via the transistor 22.

The power, $P_{in}$, into the coil 18 is equal to the power, $P_{out}$, out of the coil 16 (assuming negligible losses):

$$P_{in} = P_{out} \quad (8)$$

In terms of currents and voltages, equation (8) may be rewritten as $$(I_{rms} \cdot V_{rms}) \cos \theta = I_{BAT} \cdot V_{BAT} \quad (9)$$

where $I_{rms}$ and $V_{rms}$ are the root mean square current into and root mean square voltage across the coil 18 respectively, $I_{BAT}$ and $V_{BAT}$ are the current into and voltage across the traction battery 12 (the current and voltage measured by sensors 45, 47 respectively), and $\cos \theta$ is the phase angle between $I_{rms}$ and $V_{rms}$. (As apparent to those of ordinary skill, $\cos \theta$ is typically equal to 1 in systems with unity power factor correction.) Assuming $V_{rms}$ and $V_{BAT}$ are generally constant and according to equation (9), changes in $I_{BAT}$ will result in changes to $I_{rms}$. That is, decreasing the duty cycle of the transistor 22 to reduce $I_{BAT}$ will reduce $I_{rms}$. (The microprocessor 42 may thus also determine a change in temperature of the power and/or return lines 36, 38 based on the current and voltage measured by the current sensor 44, 45 and voltage sensor 47. For example, equation (9) may be rearranged to solve for $V_{rms}$ and substituted into (7)).

To maintain the temperature of the power and/or return lines 28, 30 within a desired range, the microprocessor 42 may begin to cycle the transistor 22, in a known manner, as the temperature and/or change in temperature of the power and/or return lines 28, 30 begins to approach an upper end of the range. For example, the microprocessor 42 may begin to cycle the transistor 42 to reduce the current flow if the change in temperature of the power and/or return lines 28, 30 exceeds 35 degrees C. Alternatively, the microprocessor 42 may begin to cycle the transistor 42 to reduce the current flow if the temperature of the power and/or return lines 28, 30 is within 7 degrees C. of the upper end of the range. Any suitable control scheme, however, may be used.

As illustrated, the charger 14 is integrated with the vehicle 10. In other embodiments, however, the charger 14 may be remote from the vehicle 10. For example, the charger 14 may be a stand alone unit that may be plugged into the electrical outlet 32 and vehicle 10. Other arrangements are also possible.

Figure 2:
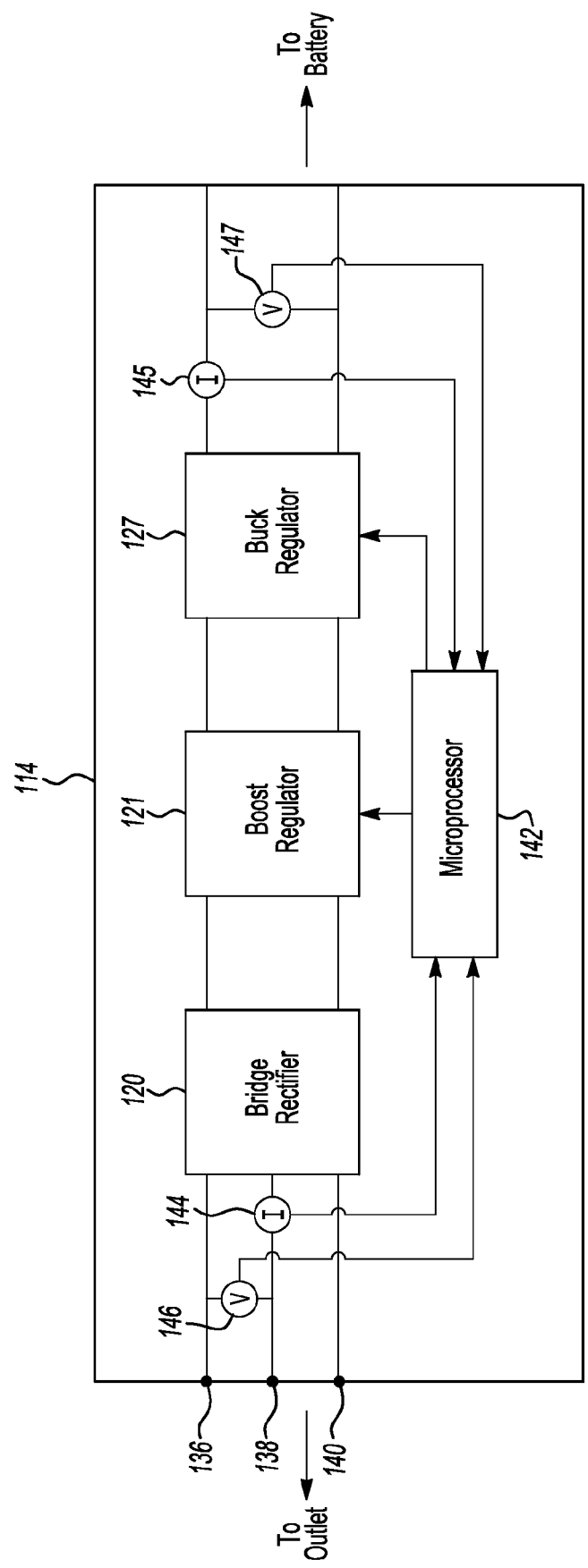
FIG. 2 is a schematic diagram of a battery charger according to an embodiment of the invention.

Referring now to FIG. 2, numbered elements that differ by 100 relative to numbered elements of FIG. 1 have descriptions that are similar, although not necessarily identical, to the numbered elements of FIG. 1.

An embodiment of a battery charger 114 includes a bridge rectifier 120, boost regulator 121, buck regulator 127 and microprocessor 142. The bridge rectifier 120 is electrically connected with the boost regulator 121. The boost regulator 121 is electrically connected with the buck regulator 127. The microprocessor 142 may control the boost and buck regulators 121, 127. The circuitry of the bridge rectifier 120, boost regulator 121 and buck regulator 127 may take any suitable form.

The bridge rectifier 120 may be electrically connected with an electrical power outlet (not shown) and convert alternating current input into direct current output. As apparent to those of ordinary skill, the microprocessor 142 may control the boost regulator 121, in a known fashion, to regulate the direct current output by the bridge rectifier 120 for power factor correction. Based on current and/or voltage measurements by the sensors 144, 146, the microprocessor 142 may control the buck regulator 127, using techniques similar to those described above, for power distribution temperature management. Of course, other arrangements and/or configurations are also possible.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. A method for monitoring a temperature change of a power distribution circuit including a power line, return line and ground line, the method comprising:
    measuring an output current and output voltage of the power distribution circuit at an input to a load electrically connected to the power distribution circuit, wherein the output voltage is measured between the ground line and one of the power line and return line; and
    determining a change in temperature of at least one of the power line and return line based on a change in at least one of the output current and output voltage.

2. The method of claim 1 further comprising controlling the output current based on the change in temperature.

3. The method of claim 1 wherein the return line comprises a neutral line.

4. A method for monitoring a temperature change of a power distribution circuit including a power line, return line and ground line, the method comprising:
    measuring an output current or output voltage of the power distribution circuit at an input to a load electrically connected to the power distribution circuit, wherein the output voltage is measured between the ground line and one of the power line and return line;
    measuring an input current and input voltage to the load; and
    determining a change in temperature of at least one of the power line and return line based on a change in at least one of the output current, output voltage, input current and input voltage.

5. The method of claim 4 further comprising controlling the output current based on the change in temperature.

* * * * *